(12) United States Patent
Zhang et al.

(10) Patent No.: US 10,349,391 B2
(45) Date of Patent: Jul. 9, 2019

(54) PHYSICAL DOWNLINK DATA CHANNEL TRANSMISSION METHOD, BASE STATION, AND USER EQUIPMENT

(71) Applicant: HUAWEI TECHNOLOGIES CO., LTD., Shenzhen (CN)

(72) Inventors: Yingyu Zhang, Shenzhen (CN); Zhenfei Tang, Shanghai (CN); Zhongfeng Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 15/425,260

(22) Filed: Feb. 6, 2017

(65) Prior Publication Data
US 2017/0150483 A1 May 25, 2017

Related U.S. Application Data

(63) Continuation of application No. PCT/CN2014/083911, filed on Aug. 7, 2014.

(51) Int. Cl.
*H04W 72/04* (2009.01)
*H04L 5/00* (2006.01)
(Continued)

(52) U.S. Cl.
CPC ........ *H04W 72/042* (2013.01); *H04B 7/2615* (2013.01); *H04L 5/0007* (2013.01);
(Continued)

(58) Field of Classification Search
CPC ........... H04W 72/0242; H04W 72/044; H04W 76/27; H04W 88/02; H04L 5/0007; H04B 7/2615
See application file for complete search history.

(56) References Cited

U.S. PATENT DOCUMENTS

2009/0262699 A1* 10/2009 Wengerter ............ H04L 1/0072
370/330
2010/0157913 A1 6/2010 Nagata et al.
(Continued)

FOREIGN PATENT DOCUMENTS

CN 101483466 A 7/2009
CN 101958774 A 1/2011
(Continued)

OTHER PUBLICATIONS

International Search Report dated May 6, 2015 in corresponding Application No. PCT/CN2014/083911.
(Continued)

*Primary Examiner* — Robert C Scheibel
(74) *Attorney, Agent, or Firm* — Staas & Halsey LLP

(57) ABSTRACT

Embodiments of the present application provide a physical downlink data channel transmission method, a base station, and user equipment. The physical downlink data channel transmission method provided in the embodiments of the present application includes: mapping a physical downlink data channel to a time-frequency resource in at least one timeslot, where a time-frequency resource in each timeslot includes at least one enhanced physical resource block pair, and the enhanced physical resource block pair includes two consecutive physical resource blocks in a frequency domain in a same timeslot; and sending the physical downlink data channel to UE. In the embodiments of the present application, a transmission time interval of the physical downlink data channel can be reduced.

13 Claims, 5 Drawing Sheets

(51) Int. Cl.
 *H04B 7/26* (2006.01)
 *H04W 76/27* (2018.01)
 *H04W 88/02* (2009.01)
(52) U.S. Cl.
 CPC ......... *H04W 72/044* (2013.01); *H04W 76/27* (2018.02); *H04W 88/02* (2013.01)

(56) References Cited

U.S. PATENT DOCUMENTS

| | | | |
|---|---|---|---|
| 2013/0148616 A1 | 6/2013 | Takano | |
| 2013/0182692 A1 | 7/2013 | Dai et al. | |
| 2014/0078987 A1* | 3/2014 | Park | H04W 72/042 370/329 |
| 2014/0192730 A1* | 7/2014 | Seo | H04L 5/0053 370/329 |
| 2015/0063292 A1 | 3/2015 | Miki et al. | |
| 2015/0282127 A1* | 10/2015 | Park | H04L 5/0053 370/329 |
| 2015/0358111 A1 | 12/2015 | Marinier et al. | |
| 2017/0026946 A1 | 1/2017 | Seo et al. | |
| 2017/0347354 A1* | 11/2017 | Yang | H04L 5/0023 |
| 2018/0139736 A1* | 5/2018 | Seo | H04W 72/0446 |

FOREIGN PATENT DOCUMENTS

| | | |
|---|---|---|
| CN | 102340394 A | 2/2012 |
| CN | 103220809 A | 7/2013 |
| CN | 103378885 A | 10/2013 |
| JP | 2006-311465 | 11/2006 |
| JP | 2008-53858 | 3/2008 |
| JP | 2009-537083 | 10/2009 |
| JP | 2012-80415 | 4/2012 |
| JP | 2014-516234 | 7/2014 |
| JP | 2016-509784 | 3/2016 |
| WO | 2014/110467 A1 | 7/2014 |

OTHER PUBLICATIONS

Japanese Office Action dated Apr. 17, 2018, in corresponding Japanese Patent Application No. 2017-506688, 6 pgs.
Extended European Search Report dated Jun. 26, 2017 in corresponding European Patent Application No. 14899220.9.
Chinese Office Action dated Aug. 31, 2018 in Chinese Patent Application No. 201480037257.2.
International Search Report dated May 6, 2015 in corresponding International Patent Application No. PCT/CN2014/083911.

* cited by examiner

PHYSICAL DOWNLINK DATA CHANNEL TRANSMISSION METHOD, BASE STATION, AND USER EQUIPMENT

CROSS-REFERENCE TO RELATED APPLICATIONS

This application is a continuation of International Application No. PCT/CN2014/083911, filed on Aug. 7, 2014, the disclosure of which is hereby incorporated by reference in its entirety.

TECHNICAL FIELD

Embodiments of the present application relate to communications technologies, and in particular, to a physical downlink data channel transmission method, a base station, and user equipment.

BACKGROUND

With development of mobile Internet technologies, a Long Term Evolution (LTE) or Long Term Evolution advanced (LTE-Advanced) cellular technology gradually replaces cellular technologies, such as Global System for Mobile Communications (GSM) and Wideband Code Division Multiple Access (WCDMA), and is widely deployed. However, with development of technologies such as the Internet of Things, machine-to-machine (Machine to Machine, M2M) communication based on the LTE cellular technology is a focus in the industry. A research result released by Strategy Analytic in November 2013 shows that a quantity of M2M connections will increase from 368 million to 2.9 billion until 2022. There are distinct features between the M2M communication and existing human-to-human (Human to Human, H2H) communication. It is necessary to introduce some enhancement technologies distinct from the H2H, so as to better support the M2M communication.

The M2M communication has a strong correlation with an application scenario and a service type. For example, in an application scenario of reading a household electricity meter, an M2M user needs to periodically send a small data packet to a network, and a service has low delay sensitivity. However, in some industrial control application scenarios, an M2M terminal is required to rapidly report detected data so that a fast reaction can be made. In this case, the M2M communication features extremely high delay sensitivity, and requires a relatively low end-to-end transmission delay.

In the prior art, a base station allocates a specific quantity of physical resource blocks (PRB) consecutive in a time domain in two timeslots (slot) to a physical downlink data channel, and sends the foregoing channel to a user side. Then transmission time from the base station to user equipment (UE) includes at least time of single transmission of the physical downlink data channel. With no other factors being considered, the time of single transmission of the physical downlink data channel includes at least one transmission time interval (TTI). Similar to a downlink data sending process, in an uplink data sending process, the UE sends a physical uplink data channel on the consecutive physical resource blocks in the time domain in two timeslots. A limitation of the TTI makes it difficult to reduce transmission time effectively, so that a delay-sensitive service or application scenario to which the M2M communication is applicable is limited.

SUMMARY

Embodiments of the present application provide a physical downlink data channel transmission method, a base station, and user equipment, so as to resolve a prior-art problem that a transmission time interval of a physical downlink data channel is difficult to be reduced.

According to a first aspect, an embodiment of the present application provides a physical downlink data channel transmission method, including:

mapping a physical downlink data channel to a time-frequency resource in at least one timeslot, where a time-frequency resource in each timeslot includes at least one enhanced physical resource block pair, and the enhanced physical resource block pair includes two consecutive physical resource blocks in a frequency domain in a same timeslot; and sending the physical downlink data channel to user equipment UE.

According to the first aspect, in a first possible implementation manner of the first aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the first aspect, in a second possible implementation manner, the method further includes:

sending scheduling information for the physical downlink data channel to the UE by using a physical downlink control channel carrying downlink control information, where the scheduling information includes resource allocation information for the physical downlink data channel on the time-frequency resource in the at least one timeslot, and the downlink control information includes resource allocation information for the physical downlink data channel in a basic unit of the enhanced physical resource block pair or an enhanced resource block group; and the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

According to the second possible implementation manner of the first aspect, in a third possible implementation manner, enhanced physical resource block pairs or enhanced resource block groups in different timeslots are numbered in a same manner, numbers of enhanced physical resource block pairs or enhanced resource block groups in ascending order of frequency in each timeslot are a consecutive integer sequence, and enhanced physical resource block pairs or enhanced resource block groups have a same number at a same frequency domain location in different timeslots.

According to the second possible implementation manner of the first aspect, in a fourth possible implementation manner, numbers of enhanced physical resource block pairs or enhanced resource block groups in at least two consecutive timeslots constitute a consecutive integer sequence, and numbers of enhanced physical resource block pairs or enhanced resource block groups in ascending order of frequency in each timeslot are consecutive.

According to any one of the second to the fourth possible implementation manners of the first aspect, in a fifth possible implementation manner, before the sending the physical downlink data channel to UE, the method further includes:

sending an indication message of a time-frequency resource to the UE by using radio resource control RRC signaling, so that the UE receives, according to the indication message of the time-frequency resource, the downlink control information sent by using the physical downlink control channel; where the indication information of the time-frequency resource is an indication message of the time-frequency resource in an even timeslot and/or an odd timeslot, and the indication message of the time-frequency resource includes: a frequency domain resource location and a starting orthogonal frequency division multiplexing OFDM symbol, or the indication message of the time-frequency resource includes: a frequency domain resource location and an OFDM symbol quantity; and correspondingly, the method further includes:

sending, according to the indication message of the time-frequency resource, the downlink control information to the UE by using the physical downlink control channel.

According to the fifth possible implementation manner of the first aspect, in a sixth possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to the sixth possible implementation manner of the first aspect, in a seventh possible implementation manner, the indication information of the timeslot relationship includes: the timeslot relationship is indicated by using 1-bit information of the downlink control information; where the timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

According to the sixth possible implementation manner of the first aspect, in an eighth possible implementation manner, the indication information of the timeslot relationship includes: the timeslot relationship is indicated by using 2-bit information of the downlink control information, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to the sixth possible implementation manner of the first aspect, in a ninth possible implementation manner, the indication information of the timeslot relationship includes: the timeslot relationship is indicated by using a number that is of the enhanced physical resource block pair or the enhanced resource block group and that is indicated by the resource allocation information, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to a second aspect, an embodiment of the present application provides a physical downlink data channel transmission method, including:

receiving scheduling information that is for a physical downlink data channel and that is sent by a base station by using a physical downlink control channel carrying downlink control information; and receiving, according to the scheduling information, the physical downlink data channel from the base station, where the scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

According to the second aspect, in a first possible implementation manner of the second aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the second aspect, in a second possible implementation manner, the resource allocation information includes resource allocation information for the physical downlink data channel in a basic unit of the enhanced physical resource block pair or an enhanced resource block group; where the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P; and correspondingly, before the receiving, according to the scheduling information, the physical downlink data channel from the base station, the method further includes:

determining, according to the resource allocation information, a resource location that is of the enhanced physical resource block pair and that is allocated by the base station to the physical downlink data channel; where the receiving, according to the scheduling information, the physical downlink data channel from the base station includes:

receiving, at the allocated resource location of the enhanced physical resource block pair, the physical downlink data channel from the base station.

According to the second possible implementation manner of the second aspect, in a third possible implementation manner, before the receiving, according to the scheduling information, the physical downlink data channel from the base station, the method further includes:

performing blind detection on the physical downlink control channel according to two downlink control information formats in a same timeslot to determine the scheduling information, where the physical downlink data channel scheduled by using the physical downlink control channel in the two downlink control information formats has different transmission time intervals.

According to the second or the third possible implementation manner of the second aspect, in a fourth possible implementation manner, enhanced physical resource block pairs or enhanced resource block groups in different timeslots are numbered in a same manner, numbers of enhanced physical resource block pairs or enhanced resource block groups in ascending order of frequency in each timeslot are a consecutive integer sequence, and enhanced physical resource block pairs or enhanced resource block groups have a same number at a same frequency domain location in different timeslots.

According to the second or the third possible implementation manner of the second aspect, in a fifth possible implementation manner, numbers of enhanced physical resource block pairs or enhanced resource block groups in at least two consecutive timeslots constitute a consecutive integer sequence, and numbers of enhanced physical resource block pairs or enhanced resource block groups in ascending order of frequency in each timeslot are consecutive.

According to any one of the second aspect to the fifth possible implementation manner of the second aspect, in a sixth possible implementation manner, before the receiving, according to the scheduling information, the physical downlink data channel from the base station, the method further includes:

receiving an indication message that is of a time-frequency resource and that is sent by the base station by using RRC signaling; and receiving, according to the indication message of the time-frequency resource, the downlink control information sent by using the physical downlink control channel, where the indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

According to the sixth possible implementation manner of the second aspect, in a seventh possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to the seventh possible implementation manner of the second aspect, in an eighth possible implementation manner, the receiving, according to the scheduling information, the physical downlink data channel from the base station includes:

receiving the physical downlink data channel according to the timeslot relationship indicated by using 1-bit information of the downlink control information; where the timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

According to the seventh possible implementation manner of the second aspect, in a ninth possible implementation manner, the receiving, according to the scheduling information, the physical downlink data channel from the base station includes:

receiving the physical downlink data channel according to the timeslot relationship indicated by using 2-bit information of the downlink control information; where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to the seventh possible implementation manner of the second aspect, in a tenth possible implementation manner, the receiving, according to the scheduling information, the physical downlink data channel from the base station includes:

receiving the physical downlink data channel according to the timeslot relationship indicated by using a number that is of the enhanced physical resource block pair or the enhanced resource block group and that is indicated by the resource allocation information, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to a third aspect, an embodiment of the present application provides a base station, including:

a mapping module, configured to map a physical downlink data channel to a time-frequency resource in at least one timeslot, where a time-frequency resource in each timeslot includes at least one enhanced physical resource block pair, and the enhanced physical resource block pair includes two consecutive physical resource blocks in a frequency domain in a same timeslot; and a sending module, configured to send the physical downlink data channel to UE.

According to the third aspect, in a first possible implementation manner of the third aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the third aspect, in a second possible implementation manner, the sending module is further configured to send scheduling information for the physical downlink data channel to the UE by using a physical downlink control channel carrying downlink control information; where the scheduling information includes resource allocation information for the physical downlink data channel on the time-frequency resource in the at least one timeslot, and the downlink control information includes resource allocation information for the physical downlink data channel in a basic unit of the enhanced physical resource block pair or an enhanced resource block group; and the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

According to the second possible implementation manner of the third aspect, in a third possible implementation manner, the sending module is further configured to send, before sending the physical downlink data channel to the UE, an indication message of a time-frequency resource to the UE by using RRC signaling, so that the UE receives, according to the indication message of the time-frequency resource, the downlink control information sent by using the physical downlink control channel; where the indication information of the time-frequency resource is an indication message of the time-frequency resource in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity; and correspondingly, the sending module is further configured to send, according to the indication message of the time-frequency resource, the downlink control information to the UE by using the physical downlink control channel.

According to the third possible implementation manner of the third aspect, in a fourth possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to a fourth aspect, an embodiment of the present application provides UE, including:

a receiving module, configured to receive scheduling information that is for a physical downlink data channel and that is sent by a base station by using a physical downlink control channel carrying downlink control information, and receive, according to the scheduling information, the physical downlink data channel from the base station; where the scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

According to the fourth aspect, in a first possible implementation manner of the fourth aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the fourth aspect, in a second possible implementation manner, the resource allocation information includes resource allocation information for the physical downlink data channel in a basic unit of the enhanced physical resource block pair or an enhanced resource block group; where the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P; and correspondingly, the UE further includes:

a determining module, configured to determine, according to the resource allocation information before the physical downlink data channel from the base station is received according to the scheduling information, a resource location that is of the enhanced physical resource block pair and that is allocated by the base station to the physical downlink data channel; and the receiving module is further configured to receive, at the allocated resource location of the enhanced physical resource block pair, the physical downlink data channel from the base station.

According to the second possible implementation manner of the fourth aspect, in a third possible implementation manner, the UE further includes:

a detection module, configured to perform, before the physical downlink data channel from the base station is received according to the scheduling information, blind detection on the physical downlink control channel according to two downlink control information formats in a same timeslot; and the determining module is further configured to determine the scheduling information according to a measurement result of the blind detection; where the physical downlink data channel scheduled by using the physical downlink control channel in the two downlink control information formats has different transmission time intervals.

According to any one of the fourth aspect to the third possible implementation manner of the fourth aspect, in a fourth possible implementation manner, the receiving module is further configured to receive, before receiving, according to the scheduling information, the physical downlink data channel from the base station, an indication message that is of a time-frequency resource and that is sent by the base station by using RRC signaling, and receive, according to the indication message of the time-frequency resource, the downlink control information sent by using the physical downlink control channel; where the indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

According to the fourth possible implementation manner of the fourth aspect, in a fifth possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to the fifth possible implementation manner of the fourth aspect, in a sixth possible implementation manner, the receiving module is further configured to receive the physical downlink data channel according to the timeslot relationship indicated by using 1-bit information of the downlink control information; where the timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

According to the fifth possible implementation manner of the fourth aspect, in a seventh possible implementation manner, the receiving module is further configured to receive the physical downlink data channel according to the timeslot relationship indicated by using 2-bit information of the downlink control information; where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to the fifth possible implementation manner of the fourth aspect, in an eighth possible implementation manner, the receiving module is further configured to receive the physical downlink data channel according to the timeslot relationship indicated by using a number that is of the enhanced physical resource block pair or the enhanced resource block group and that is indicated by the resource allocation information; where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to a fifth aspect, an embodiment of the present application provides a base station, including: a receiver, a processor, and a transmitter; where the processor is configured to map a physical downlink data channel to a time-frequency resource in at least one timeslot, where a time-frequency resource in each timeslot includes at least one enhanced physical resource block pair, and the enhanced physical resource block pair includes two consecutive physical resource blocks in a frequency domain in a same timeslot; and the transmitter is configured to send the physical downlink data channel to UE.

According to the fifth aspect, in a first possible implementation manner of the fifth aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the fifth aspect, in a second possible implementation manner, the transmitter is further configured to send scheduling information for the physical downlink data channel to the UE by using a physical downlink control channel carrying downlink control information; where the scheduling information includes resource allocation information for the physical downlink data channel on the time-frequency resource in the at least one timeslot, and the downlink control information includes resource allocation information for the physical downlink data channel in a basic unit of the enhanced physical resource block pair or an enhanced resource block group; and the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

According to the second possible implementation manner of the fifth aspect, in a third possible implementation manner, the transmitter is further configured to send, before sending the physical downlink data channel to the UE, an indication message of a time-frequency resource to the UE by using RRC signaling, so that the UE receives, according to the indication message of the time-frequency resource, the downlink control information sent by using the physical downlink control channel; where the indication information of the time-frequency resource is an indication message of the time-frequency resource in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity; and correspondingly, the transmitter is further configured to send, according to the indication message of the time-frequency resource, the downlink control information to the UE by using the physical downlink control channel.

According to the third possible implementation manner of the fifth aspect, in a fourth possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to a sixth aspect, an embodiment of the present application further provides UE, including: a receiver, a processor, and a transmitter; where the receiver is configured to receive scheduling information that is for a physical downlink data channel and that is sent by a base station by using a physical downlink control channel carrying downlink control information, and receive, according to the scheduling information, the physical downlink data channel from the base station; where the scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

According to the sixth aspect, in a first possible implementation manner of the sixth aspect, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

According to the first possible implementation manner of the sixth aspect, in a second possible implementation manner, the resource allocation information includes resource allocation information for the physical downlink data channel in a basic unit of the enhanced physical resource block pair or an enhanced resource block group; where the enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P; and correspondingly, the processor is configured to determine, according to the resource allocation information before the physical downlink data channel from the base station is received according to the scheduling information, a resource location that is of the enhanced physical resource block pair and that is allocated by the base station to the physical downlink data channel; and the receiver is further configured to receive, at the allocated resource location of the enhanced physical resource block pair, the physical downlink data channel from the base station.

According to the second possible implementation manner of the sixth aspect, in a third possible implementation manner, the processor is further configured to perform, before the physical downlink data channel from the base station is received according to the scheduling information, blind detection on the physical downlink control channel according to two downlink control information formats in a same timeslot; and determine the scheduling information according to a measurement result of the blind detection; where the physical downlink data channel scheduled by using the physical downlink control channel in the two downlink control information formats has different transmission time intervals.

According to any one of the sixth aspect to the third possible implementation manner of the sixth aspect, in a fourth possible implementation manner, the receiver is further configured to receive, before receiving, according to the scheduling information, the physical downlink data channel from the base station, an indication message that is of a time-frequency resource and that is sent by the base station by using RRC signaling, and receive, according to the indication message of the time-frequency resource, the downlink control information sent by using the physical downlink control channel; where the indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

According to the fourth possible implementation manner of the sixth aspect, in a fifth possible implementation manner, the downlink control information further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

According to the fifth possible implementation manner of the sixth aspect, in a sixth possible implementation manner, the receiver is further configured to receive the physical downlink data channel according to the timeslot relationship indicated by using 1-bit information of the downlink control information; where the timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

According to the fifth possible implementation manner of the sixth aspect, in a seventh possible implementation manner, the receiver is further configured to receive the physical downlink data channel according to the timeslot relationship indicated by using 2-bit information of the downlink control information, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to the fifth possible implementation manner of the sixth aspect, in an eighth possible implementation manner, the receiver is further configured to receive the physical downlink data channel according to the timeslot relationship indicated by using a number that is of the enhanced physical resource block pair or the enhanced resource block group and that is indicated by the resource allocation information; where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

According to the physical downlink data channel transmission method, the base station, and the user equipment provided in the embodiments of the present application, a physical downlink data channel is mapped to a time-frequency resource in at least one timeslot. Each time-frequency resource includes at least one enhanced physical resource block pair, and each enhanced physical resource block pair includes two consecutive physical resource blocks in a frequency domain in a same timeslot, so that allocation to the physical downlink data channel is actually time-frequency resource allocation according to a priority in the frequency domain. Therefore, a transmission time interval of the physical downlink data channel is reduced, and air-interface transmission time is reduced.

BRIEF DESCRIPTION OF DRAWINGS

To describe the technical solutions in the embodiments of the present application or in the prior art more clearly, the following briefly describes the accompanying drawings required for describing the embodiments. Apparently, the accompanying drawings in the following description show some embodiments of the present application, and persons of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by persons of ordinary skill in the art based on the embodiments of the present application without creative efforts shall fall within the protection scope of the present application.

Embodiment 1

Figure 1:
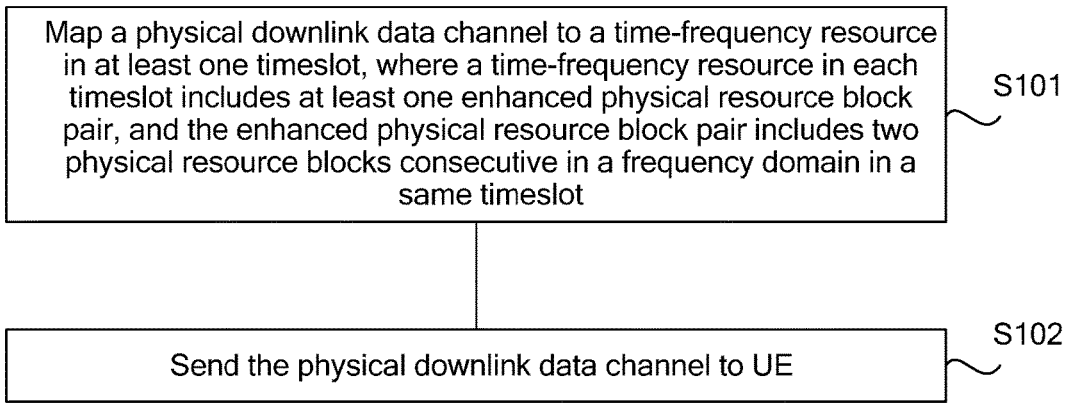
FIG. 1 is a flowchart of a physical downlink data channel transmission method according to Embodiment 1 of the present application.

FIG. 1 is a flowchart of a physical downlink data channel transmission method according to Embodiment 1 of the present application. The method in this embodiment is applicable to M2M communication in an industrial control scenario. The method is executed by a transmission apparatus, and the apparatus is generally implemented by using hardware and/or software and is integrated into a network side device. The network side device may be a base station, an evolved NodeB, a picocell base station, or the like. As shown in FIG. 1, the method includes the following steps.

Step 101: Map a physical downlink data channel to a time-frequency resource in at least one timeslot, where a time-frequency resource in each timeslot includes at least one enhanced physical resource block pair, and the enhanced physical resource block pair includes two consecutive physical resource blocks in a frequency domain in a same timeslot.

In this embodiment, specifically, frequency-division duplex (FDD) LTE is used as an example for explanation and description. In the FDD LTE, a radio frame includes 10 subframes, and each subframe includes two timeslots (slot). Each slot is 0.5 ms. In the prior art, a subframe is a smallest transmission unit. Therefore, a smallest transmission time interval for transmitting the physical downlink data channel is one subframe, that is, two timeslots: 1 ms. To make the best of a resource allocation method and a transport block size (TBS) that are designed in an existing standard, an existing PRB pair is redefined in this embodiment, and it is ensured that both PRB pairs in current and previous definition manners include a same quantity of PRBs.

In this embodiment, the time-frequency resource in each timeslot includes at least one enhanced physical resource block pair ePRB Pair). The ePRB pair is different from a physical resource block pair (PRB Pair) in the prior art, and a difference lies in that the PRB pair includes two consecutive PRBs in a time domain at a same frequency domain location, while the ePRB pair includes two consecutive PRBs in a frequency domain in a same timeslot. If the frequency domain resource in each timeslot includes at least one PRB pair, that is, if a specific quantity of consecutive PRBs in the time domain in two slots are allocated to the physical downlink data channel, a smallest transmission time interval of the physical downlink data channel is two slots. However, in this embodiment, the frequency domain resource in each timeslot includes at least one ePRB pair, and the ePRB pair includes two consecutive PRBs in the frequency domain in a same timeslot, so that the smallest transmission time interval of the physical downlink data channel may be one timeslot, that is, one slot.

The time-frequency resource in each timeslot includes at least one ePRB pair. A larger quantity of ePRB pairs indicates a wider frequency band occupied by the UE.

Step 102: Send the physical downlink data channel to UE.

In the solution of this embodiment, a physical downlink data channel is mapped to a time-frequency resource in at least one timeslot. Each time-frequency resource includes at least one enhanced physical resource block pair, and each enhanced physical resource block pair includes two consecutive physical resource blocks in a frequency domain in a same timeslot, so that allocation to the physical downlink data channel is actually time-frequency resource allocation according to a priority in the frequency domain. Therefore, a transmission time interval of the physical downlink data channel is reduced, and air-interface transmission time is reduced.

The air-interface transmission time can be reduced in the solution of this embodiment, so that a limitation of transmission time puts fewer limitations to applicable scenarios of the M2M communication.

Further, in the foregoing solution, if a quantity of PRBs included in system bandwidth or configuration bandwidth is an even number, the time-frequency resource in each timeslot includes at least one ePRB pair; or if a quantity of PRBs included in the system bandwidth or the configuration bandwidth is an odd number, the time-frequency resource in each timeslot includes at least one ePRB pair and/or one PRB. The PRB is a physical resource block highest in the frequency domain in each timeslot. The configuration bandwidth is bandwidth allocated to the UE.

Optionally, the ePRB pair included in the frequency domain resource in each timeslot may be used as a first ePRB pair, and the PRB may be used as a second ePRB pair. Then the frequency domain resource in each timeslot includes at least one first ePRB pair and one second ePRB pair. The first ePRB pair may include two consecutive PRBs in the frequency domain in a same timeslot, and the second ePRB pair may include a PRB highest in the frequency domain in each timeslot.

Different system bandwidth includes different quantities of PRBs. For example, 5 M system bandwidth includes 25 PRBs; 10 M system bandwidth includes 50 PRBs; and 20 M system bandwidth includes 100 PRBs.

If the quantity of PRBs included in the system bandwidth is an even number, such as 50, there may be 25 ePRB pairs in each timeslot, and each ePRB pair includes two consecutive PRBs in the frequency domain in a same timeslot. In this embodiment, the time-frequency resource that is in each timeslot and to which the physical downlink data channel is mapped may be at least one of the 25 ePRB pairs in a current system.

If the quantity of PRBs included in the system bandwidth is an odd number, such as 25, there may be 12 ePRB pairs and one PRB in each timeslot, and the PRB is the highest in the frequency domain. The 12 ePRB pairs each include two consecutive PRBs in the frequency domain in a same timeslot. In this embodiment, the time-frequency resource that is in each timeslot and to which the physical downlink data channel is mapped may be at least one of the 12 ePRB pairs and/or one PRB highest in the frequency domain.

The configuration bandwidth is bandwidth allocated to the UE.

Correspondingly, the time-frequency resource that is in the at least one timeslot and to which the foregoing physical downlink data channel is mapped includes a time-frequency resource in at least one timeslot within the system bandwidth or the configuration bandwidth.

If the time-frequency resource in the at least one timeslot is the time-frequency resource in the at least one timeslot within the configuration bandwidth, within the configuration bandwidth, the physical downlink data channel is mapped to the time-frequency resource in the at least one timeslot by using the method in this embodiment. Specifically, for example, the system bandwidth includes 50 PRBs. If configuration bandwidth of the user is a width of 20 PRBs, the configuration bandwidth in each timeslot includes 10 ePRB pairs, and each ePRB pair includes two consecutive PRBs in the frequency domain in a same timeslot. If the configuration bandwidth of the user is a width of 25 PRBs, there are 12 ePRB pairs and one PRB in each timeslot. The 12 ePRB pairs each include two consecutive PRBs in the frequency domain in a same timeslot, and the PRB is the last PRB in each timeslot, that is, a PRB highest in the frequency domain.

Embodiment 2

Figure 2:
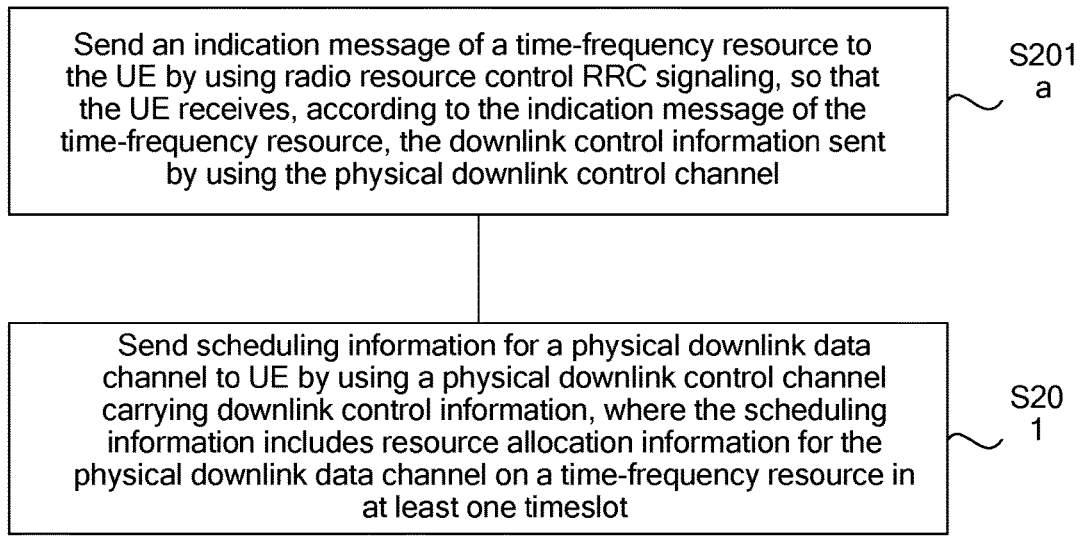
FIG. 2 is a flowchart of a physical downlink data channel transmission method according to Embodiment 2 of the present application.

This embodiment further provides a physical downlink data channel transmission method. FIG. 2 is a flowchart of a physical downlink data channel transmission method according to Embodiment 2 of the present application. As shown in FIG. 2, based on the foregoing embodiment, this embodiment further includes the following steps.

Step 201: Send scheduling information for the physical downlink data channel to the UE by using a physical downlink control channel carrying downlink control information, where the scheduling information includes resource allocation information for the physical downlink data channel on the time-frequency resource in the at least one timeslot.

Specifically, the physical downlink control channel carrying the downlink control information (Downlink Control Information, DCI for short) may be a physical downlink control channel (Physical Downlink Control Channel, PDCCH for short) or an enhanced physical downlink control channel (Enhanced Physical Downlink Control Channel, ePDCCH for short). For content in aspects such as resource mapping manners of the PDCCH and the ePDCCH, refer to the 3GPP 36.211. The scheduling information is sent to the UE by using the physical downlink control channel, so that the UE receives, according to the resource allocation information carried in the scheduling information, the physical downlink data channel on the time-frequency resource in the at least one timeslot.

The DCI includes resource allocation information for the physical downlink data channel in a basic unit of the ePRB pair or an eRBG. That is, a smallest granularity of a time-frequency resource indicated by the resource allocation information is one ePRB pair or one eRBG, and the indicated time-frequency resource includes several ePRB pairs or several eRBGs. The resource allocation information indicates a specific location of the allocated ePRB pair or the allocated eRBG The eRBG includes P ePRB pairs consecutive in the frequency domain in a same timeslot, and P is a positive integer determined according to the current system bandwidth; or the eRBG includes P or Q ePRB pairs consecutive in the frequency domain in a same timeslot, and Q is a positive integer not greater than P.

Specifically, different system bandwidth is corresponding to different values of P. A value of P may be obtained by querying a table of a prestored correspondence between system bandwidth and a value of P according to a quantity of PRBs included in the system bandwidth. For example, the table of the correspondence between system bandwidth and a value of P may be shown in the following Table 1:

TABLE 1

| System bandwidth $N_{RB}^{DL}$ | Enhanced resource block group size (P) |
|---|---|
| ≤10 | 1 |
| 11-26 | 2 |
| 27-63 | 3 |
| 64-110 | 4 |

For example, 5 M system bandwidth includes 25 PRBs; 10 M system bandwidth includes 50 PRBs; and 20 M system bandwidth includes 100 PRBs. As shown in Table 1, because the 5 M system bandwidth includes 25 RBs, a corresponding value of P that is obtained by querying according to the table is 2. If the system bandwidth is 10 M, a corresponding value of P that may be obtained by querying according to the table is 3.

If the quantity of PRBs included in the system bandwidth is an integer multiple of 2P, the time-frequency resource in each timeslot may include several eRBGs consecutive in the frequency domain, and each eRBG includes P ePRB pairs consecutive in the frequency domain. If the quantity of PRBs included in the system bandwidth is not an integer multiple of 2P, the frequency domain resource in each timeslot may include several eRBGs consecutive in the frequency domain and including P ePRB pairs consecutive in the frequency domain, and one eRBG including Q ePRB pairs consecutive in the frequency domain.

A quantity of ePRB pairs consecutive in the frequency domain in a same timeslot and included in the eRBG is related to a quantity of PRBs included in the configuration bandwidth of the user. The value of P may be still obtained by querying Table 1 according to a size of the system bandwidth. Specifically, for example, if the system bandwidth includes 50 PRBs, P=3. If the configuration bandwidth of the user is a width of 20 PRBs, the time-frequency resource in each timeslot includes three eRBGs that include P=3 ePRB pairs consecutive in the frequency domain, and one eRBG that includes Q=1 ePRB pair consecutive in the frequency domain. If the configuration bandwidth of the user is a width of 24 PRBs, configuration bandwidth in each timeslot includes four eRBGs, and any eRBG includes P=3 ePRB pairs consecutive in the frequency domain.

Further, ePRB pairs or eRBGs in different timeslots are numbered in a same manner, numbers of ePRB pairs or eRBGs in ascending order of frequency in each timeslot are a consecutive integer sequence, and ePRB pairs or eRBGs have a same number at a same frequency domain location in different timeslots.

Assuming that the system bandwidth includes N PRBs, and a number of each PRB is indicated by using $n_{PRB}$, $n_{PRB} \leq N-1$. In a scenario of using a same numbering manner in each timeslot, a number of each ePRB pair may be obtained by using the following formula (1):

$$m_{ePRB} = \left\lfloor \frac{n_{PRB}}{2} \right\rfloor; \qquad (1)$$

where $m_{ePRB}$ is a number of each ePRB pair, and $\lfloor \ \rfloor$ is a round-down operation.

In a scenario of using a same numbering manner in each timeslot, a number of each eRBG may be obtained by using the following formula (2):

$$m_{eRBG} = \left\lfloor \frac{n_{PRB}}{2P} \right\rfloor; \qquad (2)$$

where $m_{eRBG}$ is a number of each eRBG.

Table 2 is a table of a correspondence, obtained in a same numbering mode in different timeslots, between numbers of PRBs in each timeslot and numbers of ePRB pairs in each timeslot. Table 3 is a table of a correspondence, obtained in a same encoding mode in different timeslots, between PRBs in each timeslot numbering scenario and eRBGs in each timeslot. With reference to Table 2 and Table 3, the following specifically explains and describes numbers in each timeslot by using a specific example.

TABLE 2

| PRB number | 0 | 1 | 2 | 3 | 4 | 5 | 6 | 7 | ... | 20 | 21 | 22 | 23 | 24 |
|---|---|---|---|---|---|---|---|---|---|---|---|---|---|---|
| Timeslot 0 | 0 | 0 | 1 | 1 | 2 | 2 | 3 | 3 | ... | 10 | 10 | 11 | 11 | 12 |
| Timeslot 1 | 0 | 0 | 1 | 1 | 2 | 2 | 3 | 3 | ... | 10 | 10 | 11 | 11 | 12 |

TABLE 3

| PRB number | 0 | 1 | 2 | 3 | 4 | 5 | 6 | 7 | ... | 20 | 21 | 22 | 23 | 24 |
|---|---|---|---|---|---|---|---|---|---|---|---|---|---|---|
| Timeslot 0 |   | 0 |   |   | 1 |   |   |   | ... |   | 5 |   |   | 6 |
| Timeslot 1 |   | 0 |   |   | 1 |   |   |   | ... |   | 5 |   |   | 6 |

If the system bandwidth is 5 M, the system bandwidth includes 25 PRBs. For example, in Table 2 and Table 3, PRB numbers in ascending order indicates frequency domain locations in ascending order of frequency. In Table 2 and Table 3, the timeslot 0 indicates an even timeslot, and the timeslot 1 indicates an odd timeslot. As shown in Table 2, numbers from 0 to 12 corresponding to the timeslot 0 and the timeslot 1 are numbers of ePRB pairs in the timeslot 0 and the timeslot 1. A same numbering manner is used in the timeslot 0 and the timeslot 1. Likewise, in Table 3, numbers from 0 to 6 corresponding to the timeslot 0 and the timeslot 1 are numbers of eRBGs in the timeslot 0 and the timeslot 1. The same numbering manner is used in the timeslot 0 and the timeslot 1. At a frequency domain location whose PRB number is 3 in Table 2, ePRB pairs in the timeslot 0 and the timeslot 1 has a same number 1. Likewise, at a frequency domain location whose PRB number is 3 in Table 3, eRGBs in the timeslot 0 and the timeslot 1 has a same number 0.

Optionally, numbers of ePRB pairs or eRBGs in at least two consecutive timeslots constitute a consecutive integer sequence. The numbers of the ePRB pairs or the eRBGs in the at least two consecutive timeslots are numbers obtained in a joint numbering manner, and numbers of ePRB pairs or eRBGs in ascending order of frequency in each timeslot is consecutive.

Assuming that the system bandwidth includes N PRBs, and a number of each PRB is indicated by using $n_{PRB}$, $n_{PRB} \leq N-1$. The following uses consecutive numbering in two timeslots for explanation and description.

In a joint numbering scenario, a number of an ePRB pair in an even timeslot may be obtained by using the following formula (3):

$$m_{ePRB} = \lfloor n_{PRB}/2 \rfloor \quad (3)$$

where
in the formula (3), $m_{ePRB}$ is a number of each ePRB pair in an even timeslot.

In a joint numbering scenario, a number of an ePRB pair in an odd timeslot may be obtained by using the following formula (4):

$$m_{ePRB} = \lfloor \frac{N-1}{2} \rfloor + \lfloor \frac{n_{PRB}}{2} \rfloor + 1; \quad (4)$$

where
in the formula (4), $m_{ePRB}$ is a number of each ePRB pair in an odd timeslot.

In a joint numbering scenario, a number of an eRBG in an even timeslot may be obtained by using the following formula (5):

$$m_{eRBG} = \lfloor \frac{n_{PRB}}{2P} \rfloor; \quad (5)$$

where
in the formula (5), $m_{eRBG}$ is a number of each eRBG in an even timeslot.

In a joint numbering scenario, a number of an eRBG in an odd timeslot may be obtained by using the following formula (6):

$$m_{eRGB} = \lfloor \frac{N-1}{2P} \rfloor + \lfloor \frac{n_{PRB}}{2P} \rfloor + 1; \quad (6)$$

where
in the formula (6), $m_{eRBG}$ is a number of each eRBG in an odd timeslot.

Table 4 is a table of a correspondence, in a joint numbering scenario in different timeslots, between numbers of PRBs within system bandwidth and numbers of ePRB pairs in each timeslot. Table 5 is a table of a correspondence, in a joint numbering scenario in different timeslots, between numbers of PRBs within system bandwidth and numbers of eRBGs in each timeslot. With reference to Table 4 and Table 5, the following specifically explains and describes a scenario of joint numbering of ePRB pairs and eRBGs by using a specific example.

TABLE 4

| PRB number | 0 | 1 | 2 | 3 | 4 | 5 | 6 | 7 | ... | 20 | 21 | 22 | 23 | 24 |
|---|---|---|---|---|---|---|---|---|---|---|---|---|---|---|
| Timeslot 0 | 0 | 0 | 1 | 1 | 2 | 2 | 3 | 3 | ... | 10 | 10 | 11 | 11 | 12 |
| Timeslot 1 | 13 | 13 | 14 | 14 | 15 | 15 | 16 | 16 | ... | 23 | 23 | 24 | 24 | 25 |

TABLE 5

| PRB number | 0 | 1 | 2 | 3 | 4 | 5 | 6 | 7 | ... | 20 | 21 | 22 | 23 | 24 |
|---|---|---|---|---|---|---|---|---|---|---|---|---|---|---|
| Timeslot 0 | | | 0 | | | 1 | | | ... | | 5 | | | 6 |
| Timeslot 1 | | | 7 | | | 8 | | | ... | | 12 | | | 13 |

If a current system has 5 M system bandwidth, the system bandwidth includes 25 PRBs. For example, in Table 4 and Table 5, the ePRB pairs/eRBGs are numbered first in the timeslot 0 and then in the timeslot 1, and numbered in ascending order of frequency in each timeslot. The timeslot 0 indicates an even timeslot, and the timeslot 1 indicates an odd timeslot. As shown in Table 4, numbers of ePRB pairs in the timeslot 0 are 0 to 12, numbers of ePRB pairs in the timeslot 1 are 13 to 25, and numbers of ePRB pairs in the two timeslots constitute a consecutive positive integer sequence: 0 to 25. Likewise, in Table 5, numbers of eRBGs in the timeslot 0 are 0 to 6, numbers of eRBGs in the timeslot 1 are 7 to 13, and numbers of eRBGs in the two timeslots constitute a consecutive positive integer sequence: 0 to 13.

Further, in step 102 in the foregoing solution, before the physical downlink data channel is sent to the UE, the method further includes the following step:

Step 201a: Send an indication message of a time-frequency resource to the UE by using radio resource control RRC signaling, so that the UE receives, according to the indication message of the time-frequency resource, the downlink control information sent by using the physical downlink control channel.

The indication message of the time-frequency resource is an indication message of the time-frequency resource in an even timeslot and/or an odd timeslot. The indication message of the time-frequency resource includes: a frequency domain resource location and a starting orthogonal frequency division multiplexing (Orthogonal Frequency Division Multiplexing, OFDM for short) symbol. Alternatively, the indication message of the time-frequency resource includes: a frequency domain resource location and an OFDM symbol quantity.

Specifically, the physical downlink control channel may be the PDCCH or the ePDCCH. The indication message of the time-frequency resource may be a time-frequency resource indication message corresponding to the PDCCH or the ePDCCH. Radio resource control signaling may be specifically radio resource control (Radio Resource Control, RRC for short) signaling.

In this embodiment, if the physical downlink control channel is the PDCCH, the indication information of the time-frequency resource is an indication message of the time-frequency resource in an odd timeslot, including: a frequency domain resource location and an OFDM symbol quantity. According to the standard of the LTE R8, R9, or R10 release (LTE Release 8/9/10) released by the 3GPP, a normal downlink subframe includes two timeslots, and each timeslot includes six or seven OFDM symbols. The OFDM symbol quantity indicates a time domain location corresponding to the time-frequency resource. For example, a time domain location corresponding to OFDM symbols 0, 1, and 2 of the time-frequency resource in a current timeslot is indicated by using 3.

In this embodiment, if the physical downlink control channel is the ePDCCH, the indication message of the time-frequency resource is the indication message of the time-frequency resource in the even timeslot and/or the odd timeslot. The indication message of the time-frequency resource includes: the frequency domain resource location and the starting OFDM symbol.

In the solution of this embodiment, if the physical downlink control channel is the ePDCCH, time domain location information corresponding to the time-frequency resource may be indicated by using the starting OFDM symbol. For example, a time domain location corresponding to an OFDM symbol of OFDM symbols 3 to 6 of the time-frequency resource in a current timeslot is indicated by using 3.

Correspondingly, the method further includes:

sending, according to the indication message of the time-frequency resource, the downlink control information to the UE by using the physical downlink control channel.

Embodiment 3

This embodiment further provides a physical downlink data channel transmission method. The solution of this embodiment is based on the foregoing solution. Further, the downlink control information includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

Further, the indication information of the timeslot relationship includes: the timeslot relationship is indicated by using 1-bit information of the downlink control information.

The timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

Specifically, when the 1-bit information of the downlink control information is 0, it indicates that the physical downlink data channel is located in the current timeslot in which the physical downlink control channel is located, and when the 1-bit information is 1, it indicates that the physical downlink data channel is located in the next timeslot of the current timeslot in which the physical downlink control channel is located. Alternatively, when the 1-bit information of the downlink control information is 0, it indicates that the physical downlink data channel is located in the current timeslot in which the physical downlink control channel is located, and when the 1-bit information is 1, it indicates that the physical downlink data channel is located in the current timeslot in which the physical downlink control channel is located, and the next timeslot of the current timeslot.

Optionally, the indication information of the timeslot relationship includes: the timeslot relationship is indicated by using 2-bit information of the downlink control information. The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

Specifically, the timeslot relationship is indicated by using the 2-bit information of the downlink control information. For example, 00 may be used to indicate that the physical downlink data channel is located in the current timeslot in which the physical downlink control channel is located; 01 may be used to indicate that the physical downlink data channel is located in the next timeslot of the current timeslot in which the physical downlink control channel is located; and 10 may be used to indicate that the physical downlink data channel is located in the current timeslot in which the physical downlink control channel is located, and the next timeslot of the current timeslot. If the physical downlink data channel is located in the current timeslot and the next timeslot of the current timeslot in which the physical downlink control channel is located, that is, both the current timeslot and the next timeslot can be scheduled by using scheduling information carried in a physical downlink control channel in one timeslot.

Optionally, the indication information of the timeslot relationship may include: the timeslot relationship indicated by using a number that is of the ePRB pair or the eRBG and that is indicated by the resource allocation information. The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

For example, in the joint numbering manner for ePRB pairs or eRBGs in multiple timeslots, the number that is of the ePRB pair or the eRGB and that is indicated by the resource allocation information is unique in the multiple timeslots. A timeslot location at which a corresponding time-frequency resource is located may be represented by using the foregoing number.

According to this embodiment based on the solutions of the foregoing embodiments, various types of information are used to indicate different indication messages of a timeslot relationship, so that this solution is applicable to more scenarios, and has higher applicability.

Embodiment 4

Figure 3:
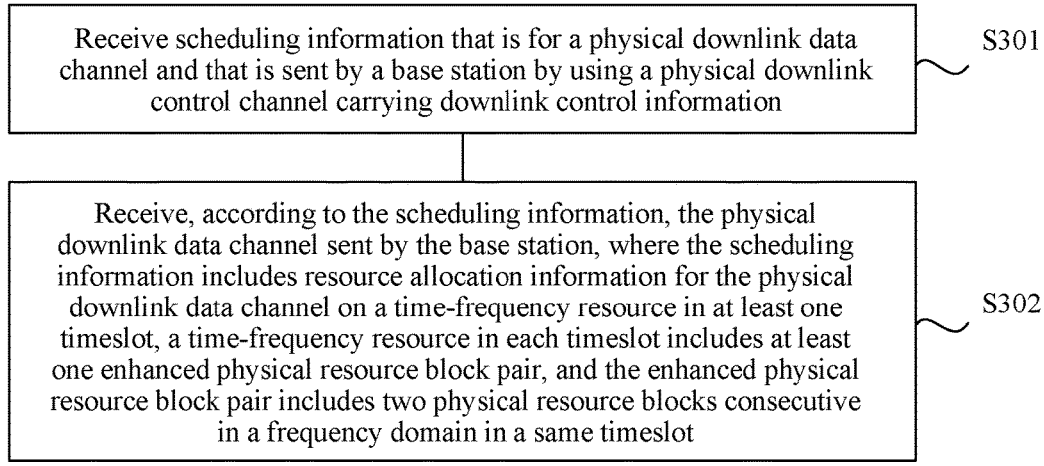
FIG. 3 is a flowchart of a physical downlink data channel transmission method according to Embodiment 4 of the present application.

This embodiment further provides a physical downlink data channel transmission method. The method in this embodiment may be specifically executed by user equipment. FIG. 3 is a flowchart of a physical downlink data information transmission method according to Embodiment 4 of the present application. As shown in FIG. 3, the method specifically includes the following steps:

Step 301: Receive scheduling information that is for a physical downlink data channel and that is sent by a base station by using a physical downlink control channel carrying downlink control information.

Step 302: Receive, according to the scheduling information, the physical downlink data channel from the base station, where the scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

The solution of this embodiment is the physical downlink data channel transmission method that is executed by UE corresponding to the foregoing embodiments, and a specific implementation process and a beneficial effect thereof are similar to those of the foregoing embodiments. Details are not described herein again.

Further, in the foregoing solution, if a quantity of physical resource blocks included in system bandwidth or configuration bandwidth is an even number, the frequency domain resource in each timeslot includes at least one enhanced physical resource block pair; or if a quantity of physical resource blocks included in the system bandwidth or the configuration bandwidth is an odd number, the frequency domain resource in each timeslot includes at least one enhanced physical resource block pair and/or one physical resource block. The physical resource block is a physical resource block highest in the frequency domain in each timeslot, and the configuration bandwidth is bandwidth allocated to the UE.

Embodiment 5

Figure 4:
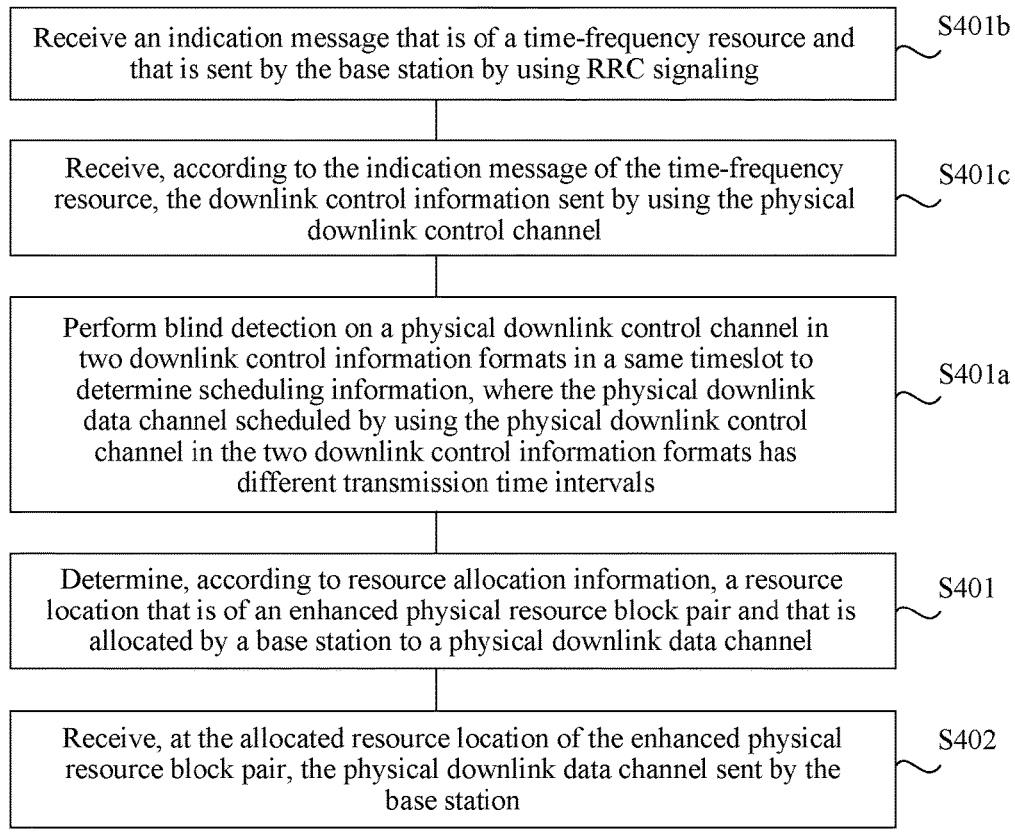
FIG. 4 is a flowchart of a physical downlink data channel transmission method according to Embodiment 5 of the present application.

This embodiment further provides a physical downlink data channel transmission method. FIG. 4 is a flowchart of a physical downlink data channel transmission method according to Embodiment 5 of the present application.

The solution of this embodiment is based on the foregoing solution. The resource allocation information includes resource allocation information for the physical downlink data channel in a basic unit of the enhanced physical resource block pair or an enhanced resource block group.

The enhanced resource block group includes P consecutive enhanced physical resource block pairs in the frequency domain in a same timeslot, and P is a positive integer determined according to the current system bandwidth; or the enhanced resource block group includes P or Q consecutive enhanced physical resource block pairs in the frequency domain in a same timeslot, and Q is a positive integer not greater than P.

If the quantity of PRBs included in the system bandwidth or the configuration bandwidth is an integer multiple of 2P, the system bandwidth includes several eRBGs consecutive in the frequency domain in each timeslot, and each eRBG includes P ePRB pairs consecutive in the frequency domain. If the quantity of PRBs included in the system bandwidth or the configuration bandwidth is not an integer multiple of 2P, the current system bandwidth includes several eRBGs (each eRBG includes P ePRB pairs consecutive in the frequency domain) consecutive in the frequency domain and one eRBG (the eRBG includes Q ePRB pairs consecutive in the frequency domain) in each timeslot.

As shown in FIG. 4, before the receiving, according to the scheduling information, the physical downlink data channel from the base station in step 302 in the foregoing solution, the method further includes the following steps:

Step 401: Determine, according to the resource allocation information, a resource location that is of the enhanced physical resource block pair and that is allocated by the base station to the physical downlink data channel.

The receiving, according to the scheduling information, the physical downlink data channel from the base station in step 302 in the foregoing solution specifically includes the following steps:

Step 402: Receive, at the allocated resource location of the enhanced physical resource block pair, the physical downlink data channel from the base station.

Preferably, before the receiving, according to the scheduling information, the physical downlink data channel from the base station in the foregoing step 302, the method may further include the following step:

Step 401*a*: Perform blind detection on the physical downlink control channel according to two downlink control information formats in a same timeslot to determine the scheduling information, where the physical downlink data channel scheduled by using the physical downlink control channel in the two downlink control information formats has different transmission time intervals.

The transmission time intervals of the physical downlink data channel scheduled by using the physical downlink control channel in the two downlink control information formats may be respectively one timeslot and two timeslots, that is, 0.5 ms and 1 ms.

Further, enhanced physical resource block pairs or enhanced resource block groups in different timeslots are numbered in a same manner, that is, numbers of enhanced physical resource block pairs or enhanced resource block groups in ascending order of frequency in each timeslot are a consecutive integer sequence, and enhanced physical resource block pairs or enhanced resource block groups have a same number at a same frequency domain location in different timeslots.

Optionally, numbers of enhanced physical resource block pairs or enhanced resource block groups in at least two consecutive timeslots constitute a consecutive integer sequence. Specifically, numbers of enhanced physical resource block pairs or enhanced resource block groups in ascending order of frequency in each timeslot are consecutive.

Based on the foregoing solution, before the receiving, according to the scheduling information, the physical downlink data channel from the base station in step 302, the method further includes the following steps:

Step 401*b*: Receive an indication message that is of a time-frequency resource and that is sent by the base station by using RRC signaling.

Step 401*c*: Receive, according to the indication message of the time-frequency resource, the downlink control information sent by using the physical downlink control channel.

The indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

Further, the downlink control information in the foregoing solution further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

Optionally, the receiving, according to the scheduling information, the physical downlink data channel from the base station in the foregoing step 302 specifically includes:

receiving the physical downlink data channel according to the timeslot relationship indicated by using 1-bit information of the downlink control information.

The timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

Alternatively, the receiving, according to the scheduling information, the physical downlink data channel from the base station in the foregoing step 302 specifically includes:

receiving, according to the timeslot relationship indicated by using 2-bit information of the downlink control information, the data information from the physical downlink data channel, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

Optionally, the receiving, according to the scheduling information, the physical downlink data channel from the base station in the foregoing step 302 may further specifically include:

receiving the physical downlink data channel according to the timeslot relationship indicated by using a number that is of the enhanced physical resource block pair or the enhanced resource block group and that is indicated by the resource allocation information, where the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

A specific implementation process and a beneficial effect of the solution of this embodiment are similar to those of the foregoing embodiment. Details are not described herein again.

Embodiment 6

Figure 5:
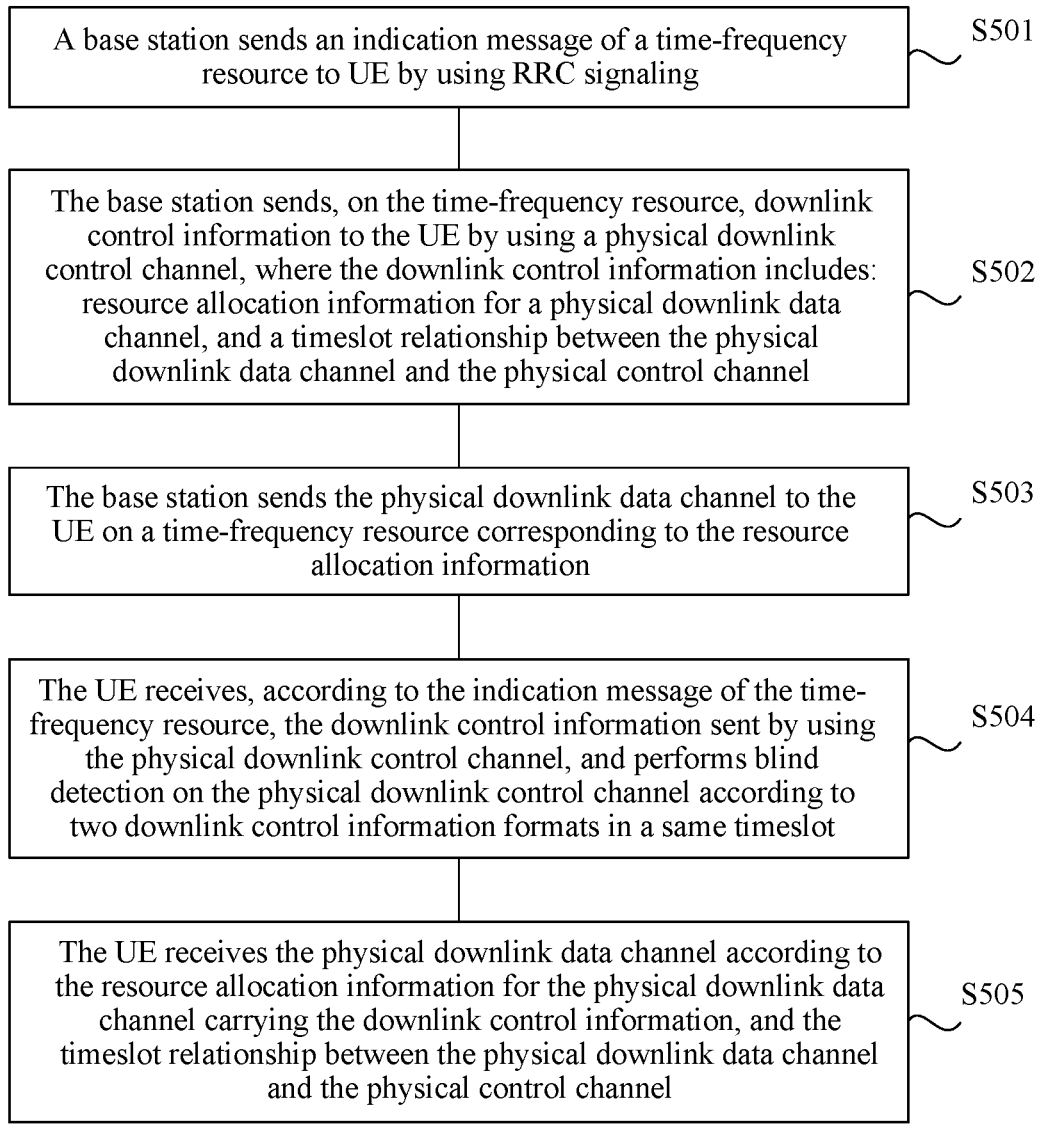
FIG. 5 is a flowchart of a physical downlink data channel transmission method according to Embodiment 6 of the present application.

This embodiment further provides a physical downlink data channel transmission method, and this embodiment is explained and described by using a specific example. FIG. 5 is a flowchart of a physical downlink data channel transmission method according to Embodiment 6 of the present application. As shown in FIG. 5, the method specifically includes the following steps:

Step 501: A base station sends an indication message of a time-frequency resource to UE by using RRC signaling.

Step 502: The base station sends, on the time-frequency resource, downlink control information to the UE by using a physical downlink control channel, where the downlink control information includes: resource allocation information for a physical downlink data channel, and a timeslot relationship between the physical downlink data channel and the physical control channel.

Step 503: The base station sends the physical downlink data channel to the UE on a time-frequency resource corresponding to the resource allocation information.

Step 504: The UE receives, according to the indication message of the time-frequency resource, the downlink control information sent by using the physical downlink control channel, and performs blind detection on the physical downlink control channel according to two downlink control information formats in a same timeslot.

Step 505: The UE receives the physical downlink data channel according to the resource allocation information that is for the physical downlink data channel and is carried in the downlink control information, and the timeslot relationship between the physical downlink data channel and the physical control channel.

It should be noted that there is no definite sequence between step 502 and step 503. Step 502 and step 503 may be simultaneously performed, or step 502 may be performed before or after step 503. Specifically, it may be determined according to the timeslot relationship between the physical downlink data channel and the physical control channel whether step 502 and step 503 are simultaneously performed, or step 503 is performed in a next timeslot after step 502. The indication information of the time-frequency resource and the resource allocation information may be similar to those in the foregoing embodiments. Details are not described herein again.

The solution of this embodiment is a specific example solution of the foregoing embodiments, and a specific implementation process and a beneficial effect are similar to those of the foregoing embodiments. Details are not described herein again.

Embodiment 7

Figure 6:
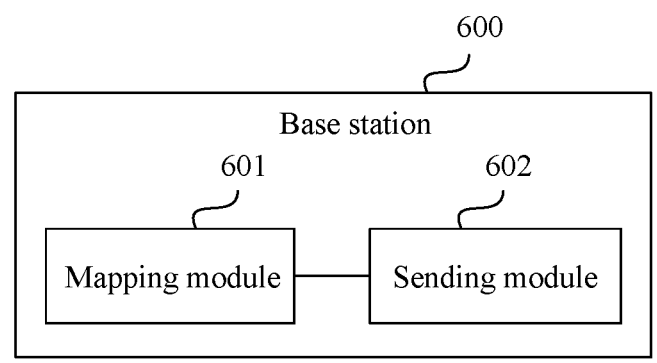
FIG. 6 is a schematic structural diagram of a base station according to Embodiment 7 of the present application.

This embodiment of the present application provides a base station. FIG. 6 is a schematic structural diagram of a base station according to Embodiment 7 of the present application.

As shown in FIG. 6, the base station 600 includes: a mapping module 601 and a sending module 602.

The mapping module 601 is configured to map a physical downlink data channel to a time-frequency resource in at least one timeslot. A time-frequency resource in each timeslot includes at least one enhanced physical resource block pair, and the enhanced physical resource block pair includes two consecutive physical resource blocks in a frequency domain in a same timeslot.

The sending module 602 is configured to send the physical downlink data channel to UE.

Further, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

Optionally, the sending module 602 of the foregoing base station 600 is further configured to send scheduling information for the physical downlink data channel to the UE by using a physical downlink control channel carrying downlink control information.

The scheduling information includes resource allocation information for the physical downlink data channel on the time-frequency resource in the at least one timeslot, and the downlink control information includes resource allocation information for the physical downlink data channel in a basic unit of the enhanced physical resource block pair or an enhanced resource block group.

The enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

Based on the solution of the foregoing embodiment, the sending module 602 is further configured to send, before sending the physical downlink data channel to the UE, an indication message of a time-frequency resource to the UE by using RRC signaling, so that the UE receives, according to the indication message of the time-frequency resource, the downlink control information sent by using the physical downlink control channel.

The indication information of the time-frequency resource is an indication message of the time-frequency resource in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

Correspondingly, the sending module 602 is further configured to send, according to the indication message of the time-frequency resource, the downlink control information to the UE by using the physical downlink control channel.

Optionally, the downlink control information in the solution of the foregoing embodiment further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

The base station provided in the solution of this embodiment can implement the physical downlink data channel transmission method executed by the base station provided in the foregoing embodiment, and a specific implementation process and a beneficial effect of the solution are similar to those of the foregoing embodiment. Details are not described herein again.

Embodiment 8

Figure 7:
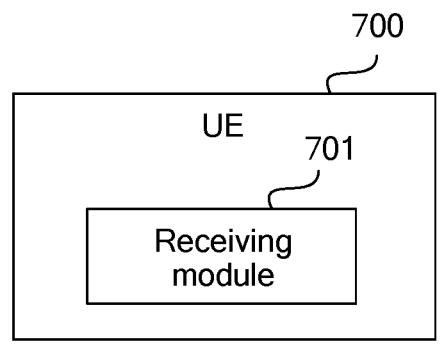
FIG. 7 is a schematic structural diagram of UE according to Embodiment 8 of the present application.

This embodiment of the present application further provides UE. FIG. 7 is a schematic structural diagram of UE according to Embodiment 8 of the present application.

As shown in FIG. 7, the UE 700 includes a receiving module 701.

The receiving module 701 is configured to receive scheduling information that is for a physical downlink data channel and that is sent by a base station by using a physical downlink control channel carrying downlink control information, and receive, according to the scheduling information, the physical downlink data channel from the base station.

The scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

Further, in this embodiment, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block.

The physical resource block is a physical resource block highest in the frequency domain in each timeslot, and the configuration bandwidth is bandwidth allocated to the UE.

Optionally, in the foregoing solution, the resource allocation information includes resource allocation information for the physical downlink data channel in a basic unit of the enhanced physical resource block pair or an enhanced resource block group.

The enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

Correspondingly, the UE 700 further includes:

a determining module, configured to determine, according to the resource allocation information before the physical downlink data channel from the base station is received according to the scheduling information, a resource location that is of the enhanced physical resource block pair and that is allocated by the base station to the physical downlink data channel.

The receiving module 701 is further configured to receive, at the allocated resource location of the enhanced physical resource block pair, the physical downlink data channel from the base station.

Based on the solution of the foregoing embodiment, the UE 700 further includes:

a detection module, configured to perform, before the physical downlink data channel from the base station is received according to the scheduling information, blind detection on the physical downlink control channel according to two downlink control information formats in a same timeslot.

The determining module is further configured to determine the scheduling information according to a measurement result of the blind detection.

The physical downlink data channel scheduled by using the physical downlink control channel in the two downlink control information formats has different transmission time intervals.

Further, in the foregoing solution, the receiving module 701 is further configured to receive, before receiving, according to the scheduling information, the physical downlink data channel from the base station, an indication message that is of a time-frequency resource and that is sent by the base station by using RRC signaling, and receive, according to the indication message of the time-frequency resource, the downlink control information sent by using the physical downlink control channel.

The indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

Optionally, the foregoing downlink control information further includes indication information of a timeslot relationship between the physical downlink control channel and the physical downlink data channel. The timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

Further, in the foregoing solution, the receiving module 701 is further configured to receive the physical downlink data channel according to the timeslot relationship indicated by using 1-bit information of the downlink control information.

The timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

Alternatively, the receiving module 701 in the foregoing solution is further configured to receive the physical downlink data channel according to the timeslot relationship indicated by using 2-bit information of the downlink control information.

The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

Optionally, the foregoing receiving module 701 is further configured to receive the physical downlink data channel according to the timeslot relationship indicated by using a number that is of the enhanced physical resource block pair or the enhanced resource block group and that is indicated by the resource allocation information.

The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

The UE provided in the solution of this embodiment can implement the physical downlink data channel transmission method executed by the UE provided in the foregoing embodiment, and a specific implementation process and a beneficial effect of the solution are similar to those of the foregoing embodiment. Details are not described herein again.

Embodiment 9

Figure 8:
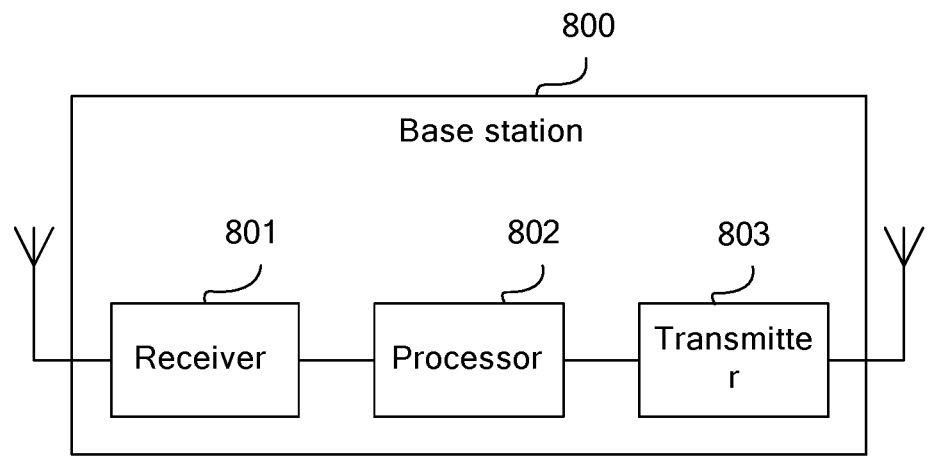
FIG. 8 is a schematic structural diagram of a base station according to Embodiment 9 of the present application.

This embodiment of the present application further provides a base station. FIG. 8 is a schematic structural diagram of a base station according to Embodiment 9 of the present application. As shown in FIG. 8, the base station 800 includes: a receiver 801, a processor 802, and a transmitter 803.

The processor 802 is configured to map a physical downlink data channel to a time-frequency resource in at least one timeslot. A time-frequency resource in each timeslot includes at least one enhanced physical resource block pair, and the enhanced physical resource block pair includes two consecutive physical resource blocks in a frequency domain in a same timeslot.

The transmitter 803 is configured to send the physical downlink data channel to UE.

Further, in the solution of this embodiment, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

Based on the solution of the foregoing embodiment, the transmitter 803 is further configured to send scheduling information for the physical downlink data channel to the UE by using a physical downlink control channel carrying downlink control information. The scheduling information includes resource allocation information for the physical downlink data channel on the time-frequency resource in the at least one timeslot, and the downlink control information includes resource allocation information for the physical downlink data channel in a basic unit of the enhanced physical resource block pair or an enhanced resource block group.

The enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

Optionally, the transmitter 803 is further configured to send, before sending the physical downlink data channel to the UE, an indication message of a time-frequency resource to the UE by using RRC signaling, so that the UE receives, according to the indication message of the time-frequency resource, the downlink control information sent by using the physical downlink control channel.

The indication information of the time-frequency resource is an indication message of the time-frequency resource in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

Correspondingly, the transmitter 803 is further configured to send, according to the indication message of the time-frequency resource, the downlink control information to the UE by using the physical downlink control channel.

Further, the downlink control information in the foregoing solution further includes indication information of a timeslot relationship between the physical downlink control channel and the physical downlink data channel. The timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

The base station provided in the solution of this embodiment can implement the physical downlink data channel transmission method executed by the base station provided in the foregoing embodiment, and a specific implementation process and a beneficial effect of the solution are similar to those of the foregoing embodiment. Details are not described herein again.

Embodiment 10

Figure 9:
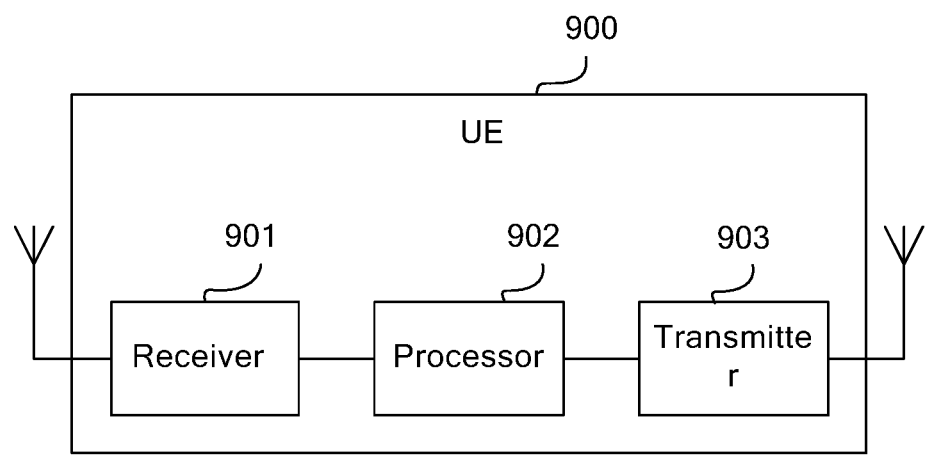
FIG. 9 is a schematic structural diagram of UE according to Embodiment 10 of the present application.

This embodiment of the present application further provides UE. FIG. 9 is a schematic structural diagram of UE according to Embodiment 10 of the present application. As shown in FIG. 9, the UE 900 includes: a receiver 901, a processor 902, and a transmitter 903.

The receiver 901 is configured to receive scheduling information that is for a physical downlink data channel and that is sent by a base station by using a physical downlink control channel carrying downlink control information, and receive, according to the scheduling information, the physical downlink data channel from the base station.

The scheduling information includes resource allocation information for the physical downlink data channel on a time-frequency resource in at least one timeslot, a time-frequency resource in each timeslot includes at least one enhanced physical resource block pair, and the enhanced physical resource block pair includes two consecutive physical resource blocks in a frequency domain in a same timeslot.

Further, in the solution of this embodiment, if a quantity of physical resource blocks included in system bandwidth or configuration bandwidth is an even number, the time-frequency resource in each timeslot includes at least one enhanced physical resource block pair; or if a quantity of physical resource blocks included in the system bandwidth or the configuration bandwidth is an odd number, the timeslot resource in each timeslot includes at least one enhanced physical resource block pair and/or one physical resource block, where the physical resource block is a physical resource block highest in the frequency domain in each timeslot, and the configuration bandwidth is bandwidth allocated to the UE.

Based on the solution of the embodiment shown above, optionally, the resource allocation information includes resource allocation information for the physical downlink data channel in a basic unit of the enhanced physical resource block pair or an enhanced resource block group.

The enhanced resource block group includes P consecutive enhanced physical resource block pairs in the frequency domain in a same timeslot, and P is a positive integer determined according to the system bandwidth; or the enhanced resource block group includes P or Q consecutive enhanced physical resource block pairs in the frequency domain in a same timeslot, and Q is a positive integer not greater than P.

Correspondingly, the processor 902 is configured to determine, according to the resource allocation information before the physical downlink data channel from the base station is received according to the scheduling information, a resource location that is of the enhanced physical resource block pair and that is allocated by the base station to the physical downlink data channel.

The receiver 901 is further configured to receive, at the allocated resource location of the enhanced physical resource block pair, the physical downlink data channel from the base station.

Further, the processor 902 is further configured to perform, before the physical downlink data channel from the base station is received according to the scheduling information, blind detection on the physical downlink control channel according to two downlink control information formats in a same timeslot; and determine the scheduling information according to a measurement result of the blind detection.

The physical downlink data channel scheduled by using the physical downlink control channel in the two downlink control information formats has different transmission time intervals.

Based on the foregoing solution, the receiver 901 is further configured to receive, before receiving, according to the scheduling information, the physical downlink data channel from the base station, an indication message that is of a time-frequency resource and that is sent by the base station by using RRC signaling, and receive, according to the indication message of the time-frequency resource, the downlink control information sent by using the physical downlink control channel.

The indication information of the time-frequency resource is an indication message in an even timeslot and/or an odd timeslot, and the indication message of the time-frequency resource includes: a frequency domain resource location and a starting OFDM symbol, or the indication message of the time-frequency resource includes: a frequency domain resource location and an OFDM symbol quantity.

Optionally, the downlink control information in the foregoing solution further includes indication information of a timeslot relationship between the physical downlink control channel and the physical downlink data channel, and the timeslot relationship between the physical downlink control channel and the physical downlink data channel includes: the physical downlink data channel is located in a current timeslot in which the physical downlink control channel is located, and/or a next timeslot of a current timeslot in which the physical downlink control channel is located.

Alternatively, the foregoing receiver 901 is further configured to receive the physical downlink data channel according to the timeslot relationship indicated by using 1-bit information of the downlink control information.

The timeslot relationship is one of the following: the physical downlink data channel is located in the current timeslot in which the physical downlink control channel is located, or the physical downlink data channel is located in the next timeslot of the current timeslot in which the physical downlink control channel is located; or the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

Alternatively, the receiver 901 is further configured to receive the physical downlink data channel according to the timeslot relationship indicated by using 2-bit information of the downlink control information. The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

Optionally, the receiver 901 is further configured to receive the physical downlink data channel according to the timeslot relationship indicated by using a number that is of the enhanced physical resource block pair or the enhanced resource block group and that is indicated by the resource allocation information.

The timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

The UE provided in the solution of this embodiment can implement the physical downlink data channel transmission method executed by the UE provided in the foregoing embodiment, and a specific implementation process and a beneficial effect of the solution are similar to those of the foregoing embodiment. Details are not described herein again.

Persons of ordinary skill in the art may understand that all or some of the steps of the method embodiments may be implemented by a program instructing related hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. A physical downlink data channel transmission method, comprising:
    mapping, by a base station, a physical downlink data channel to a time-frequency resource in at least one timeslot, wherein a time-frequency resource in each timeslot comprises at least one enhanced physical resource block pair, and the enhanced physical resource block pair comprises two consecutive physical resource blocks in a frequency domain in a same timeslot; and
    sending, by the base station, the physical downlink data channel to user equipment (UE),
    wherein if a quantity of physical resource blocks comprised in system bandwidth or configuration bandwidth is an odd number, the time-frequency resource in each timeslot comprises at least one enhanced physical resource block pair and one physical resource block, wherein the physical resource block is a physical resource block highest in the frequency domain in each timeslot, and the configuration bandwidth is bandwidth allocated to the UE,
    wherein the method further comprises:
    sending scheduling information for the physical downlink data channel to the UE by using a physical downlink control channel carrying downlink control information, wherein the scheduling information comprises resource allocation information for the physical downlink data channel on the time-frequency resource in the at least one timeslot, and the downlink control information comprises resource allocation information for the physical downlink data channel in a basic unit of the enhanced physical resource block pair or an enhanced resource block group; and
    the enhanced resource block group comprises P consecutive enhanced physical resource block pairs in the frequency domain in a same timeslot, and P is a positive integer determined according to the system bandwidth; or
    the enhanced resource block group comprises P or Q consecutive enhanced physical resource block pairs in the frequency domain in a same timeslot, and Q is a positive integer not greater than P,
    wherein before the sending the physical downlink data channel to UE, the method further comprises:
    sending an indication message of a time-frequency resource to the UE by using radio resource control RRC signaling, so that the UE receives, according to the indication message of the time-frequency resource, the downlink control information sent by using the physical downlink control channel; wherein
    the indication message of the time-frequency resource is an indication message of the time-frequency resource in an even timeslot and/or an odd timeslot, and the indication message of the time-frequency resource comprises: a frequency domain resource location and a starting orthogonal frequency division multiplexing OFDM symbol, or the indication message of the time-frequency resource comprises: a frequency domain resource location and an OFDM symbol quantity; and correspondingly, the method further comprises:
    sending, according to the indication message of the time-frequency resource, the downlink control information to the UE by using the physical downlink control channel.

2. The method according to claim 1, wherein
enhanced physical resource block pairs or enhanced resource block groups in different timeslots are numbered, numbers of enhanced physical resource block pairs or enhanced resource block groups in ascending order of frequency in each timeslot are a consecutive integer sequence, and enhanced physical resource block pairs or enhanced resource block groups have a same number at a same frequency domain location in different timeslots.

3. The method according to claim 1, wherein
numbers of enhanced physical resource block pairs or enhanced resource block groups in at least two consecutive timeslots constitute a consecutive integer sequence, and numbers of enhanced physical resource block pairs or enhanced resource block groups in ascending order of frequency in each timeslot are consecutive.

4. The method according to claim 1, wherein the downlink control information further comprises indication information of a timeslot relationship between the physical downlink control channel and the physical downlink data channel, and the timeslot relationship between the physical downlink control channel and the physical downlink data channel comprises: the physical downlink data channel is located in a current timeslot in which the physical downlink control channel is located, and/or a next timeslot of a current timeslot in which the physical downlink control channel is located.

5. The method according to claim 4, wherein
the timeslot relationship is indicated by using 1-bit information of the downlink control information; wherein
the timeslot relationship is one of the following: the physical downlink data channel is located in the current timeslot in which the physical downlink control channel is located, or the physical downlink data channel is located in the next timeslot of the current timeslot in which the physical downlink control channel is located; or
the timeslot relationship is one of the following: the physical downlink data channel is located in the current timeslot in which the physical downlink control channel is located, or the physical downlink data channel is located in the current timeslot in which the physical downlink control channel is located, and the next timeslot of the current timeslot.

6. The method according to claim 4, wherein
the timeslot relationship is indicated by using 2-bit information of the downlink control information, wherein the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

7. The method according to claim 4, wherein
the timeslot relationship is indicated by using a number that is of the enhanced physical resource block pair or the enhanced resource block group and that is indicated by the resource allocation information, wherein the timeslot relationship is one of the following: the physical downlink data channel is located in the current timeslot in which the physical downlink control channel is located, the physical downlink data channel is located in the next timeslot of the current timeslot in which the physical downlink control channel is located, or the physical downlink data channel is located in the current timeslot in which the physical downlink control channel is located, and the next timeslot of the current timeslot.

8. A base station, comprising:
a receiver;
a processor configured to map a physical downlink data channel to a time-frequency resource in at least one timeslot, wherein a time-frequency resource in each timeslot comprises at least one enhanced physical resource block pair, and the enhanced physical resource block pair comprises two consecutive physical resource blocks in a frequency domain in a same timeslot; and
a transmitter configured to:
send the physical downlink data channel to user equipment (UE),
wherein if a quantity of physical resource blocks comprised in the system bandwidth or the configuration bandwidth is an odd number, the timeslot resource in each timeslot comprises at least one enhanced physical resource block pair and one physical resource block, wherein the physical resource block is a physical resource block highest in the frequency domain in each timeslot, and the configuration bandwidth is bandwidth allocated to the UE,
wherein the transmitter is further configured to send scheduling information for the physical downlink data channel to the UE by using a physical downlink control channel carrying downlink control information;
wherein the scheduling information comprises resource allocation information for the physical downlink data channel on the time-frequency resource in the at least one timeslot, and the downlink control information comprises resource allocation information for the physical downlink data channel in a basic unit of the enhanced physical resource block pair or an enhanced resource block group; and
the enhanced resource block group comprises P consecutive enhanced physical resource block pairs in the frequency domain in a same timeslot, and P is a positive integer determined according to the system bandwidth; or
the enhanced resource block group comprises P or Q consecutive enhanced physical resource block pairs in the frequency domain in a same timeslot, and Q is a positive integer not greater than P,
wherein the transmitter is further configured to send, before sending the physical downlink data channel to the UE, an indication message of a time-frequency resource to the UE by using RRC signaling, so that the UE receives, according to the indication message of the time-frequency resource, the downlink control information sent by using the physical downlink control channel;
wherein the indication message of the time-frequency resource is an indication message of the time-frequency resource in an even timeslot and/or an odd timeslot, and the indication message of the time-frequency resource comprises: a frequency domain resource location and a starting OFDM symbol, or the indication message of the time-frequency resource comprises: a frequency domain resource location and an OFDM symbol quantity; and
correspondingly, the transmitter is further configured to send, according to the indication message of the time-frequency resource, the downlink control information to the UE by using the physical downlink control channel.

9. The base station according to claim 8, wherein the downlink control information further comprises indication information of a timeslot relationship between the physical downlink control channel and the physical downlink data channel, and the timeslot relationship between the physical downlink control channel and the physical downlink data channel comprises: the physical downlink data channel is located in a current timeslot in which the physical downlink control channel is located, and/or a next timeslot of a current timeslot in which the physical downlink control channel is located.

10. User equipment (UE), comprising:
a receiver configured to: receive scheduling information for a physical downlink data channel from a base station through a physical downlink control channel carrying downlink control information, and receive, according to the scheduling information, the physical downlink data channel from the base station, wherein
the scheduling information comprises resource allocation information for the physical downlink data channel on a time-frequency resource in at least one timeslot, a time-frequency resource in each timeslot comprises at least one enhanced physical resource block pair, and the enhanced physical resource block pair comprises two consecutive physical resource blocks in a frequency domain in a same timeslot,
wherein the receiver is further configured to receive, before receiving, according to the scheduling information, the physical downlink data channel from the base station, an indication message that is of a time-frequency resource and that is sent by the base station by using RRC signaling, and receive, according to the indication message of the time-frequency resource, the downlink control information sent by using the physical downlink control channel;
wherein the indication message of the time-frequency resource is an indication message in an even timeslot and/or an odd timeslot, and the indication message of the time-frequency resource comprises: a frequency domain resource location and a starting OFDM symbol, or the indication message of the time-frequency resource comprises: a frequency domain resource location and an OFDM symbol quantity.

11. The UE according to claim 10, wherein if a quantity of physical resource blocks comprised in the system bandwidth or the configuration bandwidth is an odd number, the timeslot resource in each timeslot comprises at least one enhanced physical resource block pair and one physical resource block, wherein the physical resource block is a physical resource block highest in the frequency domain in each timeslot, and the configuration bandwidth is bandwidth allocated to the UE.

12. The UE according to claim 11, further comprising a processor,
   wherein the resource allocation information comprises resource allocation information for the physical downlink data channel in a basic unit of the enhanced physical resource block pair or an enhanced resource block group; wherein
   the enhanced resource block group comprises P consecutive enhanced physical resource block pairs in the frequency domain in a same timeslot, and P is a positive integer determined according to the system bandwidth; or
   the enhanced resource block group comprises P or Q consecutive enhanced physical resource block pairs in the frequency domain in a same timeslot, and Q is a positive integer not greater than P, and
   correspondingly, the processor is configured to determine, according to the resource allocation information before the physical downlink data channel from the base station is received according to the scheduling information, a resource location that is of the enhanced physical resource block pair and that is allocated by the base station to the physical downlink data channel; and
   the receiver is further configured to receive, at the allocated resource location of the enhanced physical resource block pair, the physical downlink data channel from the base station.

13. The UE according to claim 12, wherein
   the processor is further configured to perform, before the physical downlink data channel from the base station is received according to the scheduling information, blind detection on the physical downlink control channel according to two downlink control information formats in a same timeslot; and determine the scheduling information according to a measurement result of the blind detection; wherein
   the physical downlink data channel scheduled by using the physical downlink control channel in the two downlink control information formats has different transmission time intervals.

* * * * *